(12) United States Patent
Uttaro

(10) Patent No.: US 7,656,876 B1
(45) Date of Patent: *Feb. 2, 2010

(54) MPLS VIRTUAL PRIVATE NETWORK USING DUAL NETWORK CORES

(75) Inventor: James Uttaro, Staten Island, NY (US)

(73) Assignee: AT&T Intellectual Propery II, L.P., Bedminster, NJ (US)

( * ) Notice: Subject to any disclaimer, the term of this patent is extended or adjusted under 35 U.S.C. 154(b) by 313 days.

This patent is subject to a terminal disclaimer.

(21) Appl. No.: 11/881,352

(22) Filed: Jul. 26, 2007

Related U.S. Application Data

(63) Continuation of application No. 10/328,060, filed on Dec. 23, 2002, now Pat. No. 7,257,119.

(51) Int. Cl.
*H04L 12/28* (2006.01)

(52) U.S. Cl. ............ 370/395.1; 370/392; 370/474

(58) Field of Classification Search ........... 370/401, 370/389, 392, 466, 467, 473, 474, 410, 422, 370/426, 352, 353, 354, 395
See application file for complete search history.

(56) References Cited

U.S. PATENT DOCUMENTS 6,339,488 B1 * 1/2002 Beshai et al. .............. 398/59

\* cited by examiner

*Primary Examiner*—Creighton Smith
(74) *Attorney, Agent, or Firm*—Michael Haynes PLC; Michael N. Haynes

(57) ABSTRACT

A multi-protocol label switching system using multiple cores. In establishing a virtual private network in a MPLS system, more than one core is available. Paths are established over each core separately and weights are assigned to the two routes. Thus, the route which is preferred by manually configuring in advance will be chosen.

19 Claims, 1 Drawing Sheet

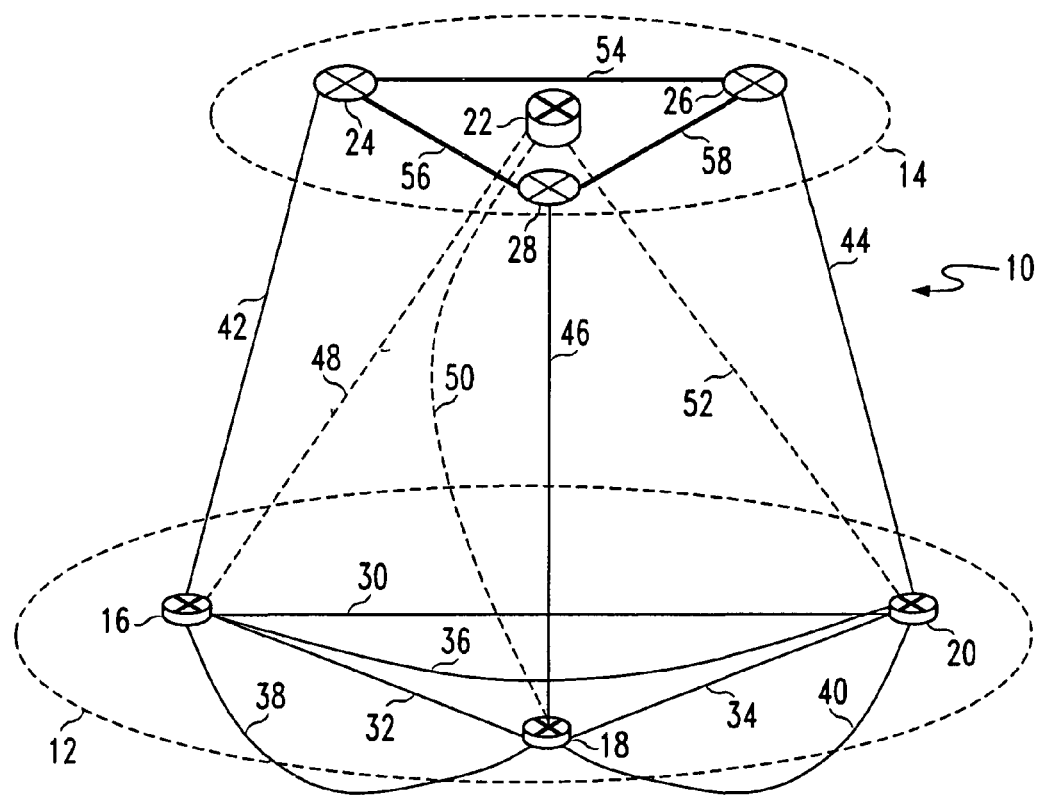

MPLS VIRTUAL PRIVATE NETWORK USING DUAL NETWORK CORES

This application is a continuation of, claims priority to, and incorporates by reference herein in its entirety, U.S. patent application Ser. No. 10/328,060, filed 23 Dec. 2002 now U.S. Pat. No. 7,257,119 by James Uttaro.

BACKGROUND OF THE INVENTION

1. Field of the Invention

The present invention relates generally to a MPLS data network system and more particularly to a MPLS system where multiple cores can be used for transporting data and different weights are assigned to the different cores.

2. Description of the Background Art

The present day worldwide web is composed of a number of interconnected data networks throughout the world. These data networks may be of a number of different types, and were developed by different providers, based on different protocols. More recently, a MPLS (multi-protocol label switching) network has been designed which allows various dissimilar data packets to be carried by the same network with the addition of new labels, which are recognized by the MPLS system, regardless of the source of the original data. Thus, the MPLS network may be connected to dissimilar networks and carry packets of data between them.

Entry points to a MPLS network are known as label edge routers. Such a router can accept traffic from different sources and thus may be connected to different networks. Data packets are assigned labels as they enter the network. These labels can provide a mechanism to group related sets of the packets together and isolate one group of packets from another. Thus, the packets are forwarded at layer 2, which eliminates the need for layer 3 forwarding between nodes. This simplifies the forwarding process and results in high speed and high performance.

Arrangements of MPLS networks are seen, for example, in U.S. Pat. Nos. 6,477,166 and 6,473,421.

The MPLS network can be used successfully by network service providers, which provide a virtual private network service for their customers. That is, the data stream can be controlled without having to stop at every node along the path by setting up an end-to-end label-switching path. However, further improvements in these networks are possible, especially in a circumstance where a system is being replaced or upgraded in order to avoid any loss of service for the customer.

SUMMARY OF THE INVENTION

Accordingly, the present invention provides a method for using multiple network cores in a MPLS system.

Also, the present invention provides a system for using two or more network cores to provide a virtual private network in a MPLS system.

The present invention further provides a system for providing dual network cores in a MPLS system where different weights are provided for the different cores.

The present invention still further provides a method for weighting routes in dual network cores in a MPLS system.

The present invention further provides a MPLS virtual private network using dual network cores where the route through one core has a different weighting than the route through the other.

Briefly, this is achieved by providing a network having multiple cores within the network with addresses provided over both cores and a selection made based on a weight assigned to the different cores.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The FIGURE is a diagram showing the system of the present invention.

DESCRIPTION OF THE PREFERRED EMBODIMENTS

Referring now to the drawing, wherein the present system is shown as 10. This system includes two different network cores 12 and 14. Each core includes a series of routers. In network 12, routers 16, 18 and 20 are shown. In network 14, routers 24, 26 and 28 are shown. Network 14 also includes a route reflector 22.

The routers in network 12 are connected to each other as shown by lines 30, 32 and 34. Likewise, the routers in network 14 are connected by lines 54, 56 and 58. While these are shown as individual lines, in fact each of the lines may include a series of other routers along the way. Also, of course, each of the networks contains considerably more than three routers.

In addition to the lines for carrying data between the routers, there are also connections to establish addresses between the various routers. Thus, in network 12 these are labeled as 36, 38 and 40. When data packets are passed from one router to another, a path is first established by advertising addresses to other routers in the network. The path is then established before the data packet is passed. It is also possible for data to be transferred between routers in different networks. Thus, lines 42, 44 and 46 connect corresponding routers in different networks.

A route reflector 22 is also provided in network 14 to advertise addresses between the two different networks. Thus, address connections 48, 50 and 52 are provided between this route reflector and the routers of network 12.

In operation, incoming data packets are connected to a label edge router in each core. Alternatively, one edge router may be used which is connected to routers in both cores. When data is set to be transferred, a private virtual network is established by advertising addresses in both cores. Two different paths are established with one path in each core. This arrangement allows a permanent virtual circuit to be formed in each network so that the data can be carried in either network. Weights are assigned to the different paths. If the weights are equal, the various packets will balance the load of the traffic over each core. However, normally one route will be favored over the other and assigned a higher weight. This is manually configured into the network. As a result, packets are carried through one core rather than the other under normal conditions. However, this arrangement provides the ability of the other core to also carry the data.

This arrangement can be especially useful in certain circumstances. Thus, if the system is being upgraded to a different type of network, it is possible to slowly bring data into the new network as it is being implemented. Thus, customers can be migrated from one network core to another. It is also possible to use both cores in order to increase the capacity of the system. It further provides the ability to use different parallel carriers when necessary.

In operation, if the input is connected to router 16 which operates as the edge router, a first path is established in network 12 by first advertising addresses over connections 36, 38 and 40 and a path is established across the network using paths 30, 32 and 34. Of course, both the addressing and data paths have many more possible combinations. At the same time, a second path is configured through network 14 by advertising addresses with route reflector 22 as indicated by 48, 50 and 52. The route is then established using routers 24, 26 and 28 and data paths 54, 56 and 58. However, once the two paths are established, a weight is given to each path, which is preset into the networks manually. The weighting causes one path to be favored over the other.

It is also possible to utilize two cores merely as redundancy feature to avoid problems with quality of service or to handle overload situations.

Numerous additional modification and variations of the present invention are possible in light of the above teachings. It is therefore to be understood that within the scope of the appended claims, the invention may be practiced otherwise than as specifically described herein.

What is claimed is:

1. A method comprising:
    selecting a path for data transmission from a plurality of determined paths based upon path weightings, a path weighting determined for each path of said plurality of determined paths, each of said plurality of determined paths established in a single core of a plurality of provided cores, an identical parallel data input received by each core of said plurality of cores.
2. The method of claim 1, further comprising:
   providing said plurality of cores.
3. The method of claim 1, further comprising:
   receiving said data input at each core of said plurality of cores.
4. The method of claim 1, further comprising:
   determining each path of said plurality of determined paths.
5. The method of claim 1, further comprising:
   weighting each path of said plurality of determined paths.
6. The method of claim 1, further comprising:
   transmitting said data input via an established private virtual network between routers on said selected path, said virtual private network established by advertising addresses in at least two cores of said plurality of cores.
7. The method of claim 1, further comprising:
   establishing at least two distinct paths with one path of said at least two different paths in each core.
8. The method of claim 1, wherein, one edge router is connected to more than one core.
9. The method of claim 1, wherein, each path is determined by advertising addresses in a corresponding core of said plurality of cores.
10. The method of claim 1, wherein, said path weighting are set equally to balance a load of traffic over each core.
11. The method of claim 1, wherein, said path weighting are set manually in advance.
12. An MPLS system for transporting data, comprising:
    a plurality of routers in each core of a plurality of cores, each of said plurality of routers adapted to establish one or more data paths in each core of said plurality of cores, a data path selected from said one or more data paths in each core based upon a weight manually inserted for each path, an identical parallel data input received by each of said plurality of cores.
13. The system of claim 12, further comprising:
    said plurality of cores.
14. The system of claim 12, further comprising:
    at least one edge router.
15. The system of claim 12, wherein, said data path forms a virtual private network for a customer.
16. The system of claim 12, wherein, one edge router is provided for each core.
17. The system of claim 12, wherein, addresses are advertised to establish each data path within said plurality of cores.
18. The system of claim 12, wherein, distinct routing protocols are followed in different cores.
19. A machine-readable medium comprising machine instructions for activities comprising:
    selecting a path for data transmission from a plurality of determined paths based upon path weightings, a path weighting determined for each path of said plurality of determined paths, each of said plurality of determined paths established in a single core of a plurality of provided cores, an identical parallel data input received by each core of said plurality of cores.

* * * * *